Patented July 10, 1945

2,380,035

UNITED STATES PATENT OFFICE 2,380,035

PROCESS FOR THE PRODUCTION OF AROMATIC HYDROCARBONS

Kenneth C. Edson and Frank E. Fisher, Pawhuska, Okla., assignors to Skelly Oil Company, Tulsa, Okla., a corporation of Delaware No Drawing. Application May 28, 1943, Serial No. 488,888

14 Claims. (Cl. 260—673.5)

This invention relates to the catalytic conversion of hydrocarbons and more particularly to the catalytic conversion of aliphatic hydrocarbons to aromatic hydrocarbons.

It is well known that aliphatic hydrocarbons may be converted to aromatic hydrocarbons by subjecting an aliphatic hydrocarbon to elevated temperatures in the presence of a cyclizing and dehydrogenating catalyst. Catalysts of this type which have been proposed in the past may comprise the oxides or other compounds of vanadium, chromium, molybdenum, titanium, zirconium, cerium, hafnium, thorium, columbium, tantalum, tungsten, uranium, etc., deposited on a suitable carrier or support such as activated alumina, bauxite, bentonite, kieselguhr, glauconite and the like. For example, suitable aromatization catalysts may contain a major proportion of aluminum oxide as a carrier and a minor proportion of chromium oxide, vanadium oxide or molybdenum oxide as the active ingredient.

In accordance with the present invention, it has been discovered that the efficiency of aromatization catalysts can be improved to increase the yield of aromatic compounds when used in an aromatization process by the addition of relatively small amounts of barium peroxide thereto. The barium peroxide serves as a promotor or activator for the catalyst and increases the efficiency of the catalyst in a process for the conversion of straight-chain hydrocarbons to aromatic hydrocarbons.

In accordance with the present invention, aromatic hydrocarbons are produced from aliphatic hydrocarbons by subjecting the aliphatic hydrocarbons at elevated temperatures to an aromatization catalyst having barium peroxide associated therewith. The aromatization catalyst itself may comprise chromium oxide, vanadium oxide, molybdenum oxide, or the like and the catalyst and barium peroxide may be supported on any suitable carrier such as bauxite, activated alumina, bentonite, kieselguhr, crushed silica, etc.

In accordance with prior art processes, an aromatization catalyst may be produced by precipitating an oxide or other compound of chromium, vanadium, molybdenum, or the like with alumina to form a gel which is thereafter dried to form the desired catalyst. If desired, alumina may be impregnated directly with a solution of a salt or acid of chromium, vanadium, molybdenum, or the like and subsequently dried to form the catalyst. However, irrespective of the manner in which the catalyst may be formed, it has been found, in accordance with the present invention, that the addition of barium peroxide to the catalyst increases its activity to a substantial degree, thus making it capable of producing yields of aromatic hydrocarbons higher than heretofore obtainable when aliphatic hydrocarbons are passed at elevated temperatures thereover.

The catalyst and its preparation forms no part of the invention claimed in this application, but has been more specifically pointed out and claimed in our co-pending application Serial No. 468,110, filed December 7, 1942.

In the preparation of the highly active catalyst to be used in the process of this invention, the barium peroxide may be added to the catalyst as such or it may be formed directly within the catalytic mass from compounds of barium that are convertible to the peroxide. For example, barium oxide (BaO) may be added directly to the catalyst and then converted to the peroxide ($BaO_2$) by heating the catalyst to a temperature between 500° and 600° C. in the presence of air or other oxygen-containing gas. Thus it is possible to use, instead of barium peroxide, barium oxide or one of the soluble salts of barium which will decompose to the oxide on heating and which then in turn may be oxidized to form the peroxide at an elevated temperature as indicated above. A unique property of the barium oxides is that the peroxide decomposes again to the monoxide at a temperature of about 800° to 900° C. Accordingly the catalyst containg barium perodixe should not be allowed to reach this temperature even when being regenerated, not only because of the decomposition of the barium peroxide, but also because heat to temperatures above 900° C. has a tendency to destroy the activity of the chromium, molybdenum, or vanadium oxide catalysts. However, even though such a temperature is reached, the barium oxide can be reoxidized to the peroxide in the presence of air or oxygen at the lower temperature.

In the preparation of the catalyst to be used in accordance with this invention certain precautions should be observed, as pointed out in our above referred to co-pending patent application. Ordinarily the use of water or aqueous solutions should be avoided in that step of the process in which the barium oxide or barium peroxide is to be admixed with the catalyst. Both barium oxide and barium peroxide react with water to form barium hydroxide which is stable and will not decompose to the oxide except at temperatures of approximately 1000° C.

Therefore other solvents should be resorted to such as absolute alcohol or the like if an impregnating procedure is to be followed. Ordinarily the powdered barium oxide or peroxide may be associated with the catalyst by mechanically mixing and if desired the catalyst may be previously moistened with a suitable nonaqueous, nonionizing wetting agent such as acetone or carbon tetrachloride.

For the preparation of the catalyst for use in accordance with the process of this invention, the following procedures may be used. However, it is to be understood that this invention is not to be limited to the use of the specific catalysts disclosed in the following examples:

PREPARATION I

Ten to twelve mesh granules of activated alumina are impregnated with a solution of chromic acid ($H_2CrO_4$) or chromic nitrate ($Cr(NO_3)_3$) of such a concentration and in such an amount as to give on decomposition 8 per cent of chromium sesquioxide ($Cr_2O_3$) on the alumina. The resulting product is evaporated to dryness on a hot plate at a temperature below 190° C. The catalyst is then wet with some nonionizing solvent other than water and 8 per cent of powdered barium oxide or barium peroxide is mechanically stirred into the mixture. If barium peroxide is used, the catalyst is ready for immediate use. In the event that barium oxide is used, the catalyst is heated to between about 500° and 600° C. in the presence of air or oxygen for a period of about one hour so as to oxidize the barium oxide to the peroxide.

PREPARATION II

Chromic acid is placed on activated alumina and dried as in Preparation I supra. The chromic acid anhydride ($CrO_3$) thus formed is then reduced to the sesquioxide by heat or by contact with a reducing substance. The resulting mass is then impregnated with a solution of a salt of barium that will give the oxide on heating, for example, barium nitrite ($Ba(NO_2)_2$). The amount of the salt of barium that is used is such as to give an 8 per cent concentration of barium peroxide when the mixture is eventually heated in the presence of oxygen to form the barium peroxide.

PREPARATION III

The same procedure is followed as indicated in Preparation I, supra, except that ammonium vanadate ($NH_4VO_3$) is substituted for the chromic acid or chromic nitrate. The resulting catalyst comprising a mixture of activated alumina, vanadium sesquioxide ($V_2O_3$) and barium peroxide is a very active aromatization catalyst.

PREPARATION IV

This preparation is the same as Preparation II, supra, except that ammonium vanadate is substituted for the chromic acid.

PREPARATION V

This method is the same as Preparation I, supra, except that ammonium molybdate

[$(NH_4)_2MoO_4$ or $(NH_4)_6Mo_7O_{24}$]

is substituted for the chromic acid or chromic nitrate. The resulting catalyst containing activated alumina, molybdenum sesquioxide ($Mo_2O_3$) and barium peroxide is a highly efficacious aromatization catalyst.

PREPARATION VI

This process is the same as Preparation II, supra, except that ammonium molybdate is substituted for the chromic acid.

The foregoing examples of the preparation of an improved catalyst comprising chromium, vanadium or molybdenum sesquioxides deposited on an alumina support and activated by barium peroxide are presented herein merely as examples which are susceptible to various modifications. This invention is not to be considered as limited to methods involving the exact chromium, vanadium, molybdenum, barium, or other compounds mentioned above or to methods employing the exact proportions of ingredients specified. For example, the oxides or other compounds of titanium, zirconium, cerium, hafnium, thorium, columbium, tantalum, tungsten or uranium may also be used. Mixtures of the compounds or oxides specified immediately above may also be employed if desired. Although activated alumina has been found to be particularly useful, other supports or carriers may be substituted therefor or admixed therewith, such supports or carriers being magnesium oxide, aluminum oxide, bauxite, bentonite clays, montmorillonite clays, kieselguhr, crushed firebrick, crushed silica, glauconite, etc. In accordance with the present invention, the barium peroxide serves as an activator or promoter for any type of aromatization catalyst which may be supported on any suitable carrier.

The improved catalysts of the present invention may be employed as aromatization catalysts for the conversion of hydrocarbons having from six to twelve carbon atoms, or as combined cracking and aromatization catalysts for hydrocarbons ranging up to twenty carbon atoms. The use of these catalysts with hydrocarbons having from six to twelve carbon atoms has already been described and claimed in our application Serial No. 468,111, filed December 7, 1942, and the present application is to be considered as a continuation-in-part of said application Serial No. 468,111, we having found that, contrary to what would normally have been expected, hydrocarbons having more than twelve carbon atoms were also capable of conversion into aromatic (i. e. cyclic compounds by the use of catalysts containing barium peroxide.

To illustrate the superior activity of the improved catalyst having barium peroxide associated therewith, a comparison of the activity of catalysts with which barium peroxide has and has not been associated has been made. In one series of these comparative tests normal heptane was passed over the several catalysts at about 550° C. at atmospheric pressure and with a contact time of about 15 seconds. The following Table A shows that the conversion of heptane to toluene was substantially greater when passed over those catalysts containing barium peroxide:

Table A

| Catalyst | Once-through yield of toluene |
|---|---|
| | Per cent |
| 92% $Al_2O_3$+8% $Cr_2O_3$ | 41 |
| 88% $Al_2O_3$+8% $Cr_2O_3$+4% $BaO_2$ | 44 |
| 84% $Al_2O_3$+8% $Cr_2O_3$+8% $BaO_2$ | 48 |
| 92% $Al_2O_3$+8% $V_2O_3$ | 40 |
| 88% $Al_2O_3$+8% $V_2O_3$+4% $BaO_2$ | 44 |
| 84% $Al_2O_3$+8% $V_2O_3$+8% $BaO_2$ | 47.5 |
| 92% $Al_2O_3$+8% $Mo_2O_3$ | 40 |
| 88% $Al_2O_3$+8% $Mo_2O_3$+4% $BaO_2$ | 43 |
| 84% $Al_2O_3$+8% $Mo_2O_3$+8% $BaO_2$ | 47 |

It will be seen from the above data of Table A that the activity of a catalyst containing 8 per cent of barium peroxide was approximately 20 per cent greater than that of a catalyst which did not have any barium peroxide associated therewith, when employed for the aromatization of heptane. In connection with the experiments which were run to obtain the above indicated data it was observed that the rate of carbon formation due to side reactions was much less when the catalyst containing barium peroxide was used, thus permitting longer operating periods between regeneration.

To further illustrate the superior activity of the improved catalyst having barium peroxide associated therewith, a comparison of the activity of catalysts with which barium peroxide has and has not been associated has also been made with hydrocarbons having a larger number of carbon atoms. In these further comparative tests, heavy straight run gasoline (B. P. 128° to 209° C.), kerosene (B. P. 169° to 263° C.), and gas oil having an end point of 371° C. were passed over the different catalysts at about 490° C. at atmospheric pressure and with a contact time of about 15 seconds. The following Table B shows that the conversions of such hydrocarbons were greater when passed over those catalysts containing barium peroxide:

Table B

| Catalyst | Once-through yield of aromatics |
| --- | --- |
| CHARGE: HEAVY STRAIGHT RUN GASOLINE | |
| | Percent |
| 92% $Al_2O_3$+8% $Cr_2O_3$ | 37 |
| 84% $Al_2O_3$+8% $Cr_2O_3$+8% $BaO_2$ | 41 |
| CHARGE: KEROSENE | |
| 92% $Al_2O_3$+8% $Cr_2O_3$ | 47 |
| 84% $Al_2O_3$+8% $Cr_2O_3$+8% $BaO_2$ | 51 |
| CHARGE: 371° C. END POINT GAS OIL | |
| 92% $Al_2O_3$+8% $Cr_2O_3$ | 48 |
| 84% $Al_2O_3$+8% $Cr_2O_3$+8% $BaO_2$ | 51 |

It will be seen from the above data that the activity of a catalyst containing 8 per cent of barium peroxide was approximately 10 per cent greater than that of a catalyst which did not have any barium peroxide associated therewith. In connection with the experiments listed in Table B, it was also observed that the rate of carbon formation due to side reactions was much less when the catalyst containing barium peroxide was used, thus permitting longer operating periods between regenerations.

The products obtained when operating under the conditions indicated in Table B, and which were made with the catalysts containing barium peroxide, had relatively high octane number, and were found to be suitable for use as a motor fuel and, due to the combination cracking and aromatization reaction, boiled largely within the gasoline boiling point range.

The foregoing data is intended merely to illustrate the efficiency of the herein described barium peroxide-containing catalyst and is in no wise to be considered as a limitation on the type of process in which this invention can be used. It has been found that aromatization of hydrocarbons by the herein described catalyst may be effected at temperatures between about 400° C. and 700° C. The preferred range, however, is between about 450° C. and 600° C. Also any contact period may be employed, it being preferred, however, to contact the hydrocarbons at elevated temperatures with the catalyst for a period between one and less than about 25 seconds. Atmospheric pressures are ordinarily preferred but subatmospheric or superatmospheric pressures may be employed if desired. The process is applicable to the treatment of hydrocarbons having from about six to twenty carbon atoms. Where both cracking as well as aromatization is involved, the boiling point range is about from 215° C. to 370° C. Also to increase the percentage of over-all conversion of aliphatic hydrocarbons to aromatic hydrocarbons, recycling may be employed.

The relative proportions of ingredients in the active catalyst used in the process of this invention may vary within wide limits. However, the support or carrier preferably constitutes a major proportion by weight of the catalytic body and suitably 50 to 92 per cent; and the other ingredient preferably constitutes a minor proportion by weight of the catalytic body, the barium peroxide being suitably present in amounts between about 4 and 25 per cent, and the chromium, vanadium or molybdenum sesquioxide or other catalytic substance being suitably present in amounts between about 4 and 25 per cent.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for the production of aromatic hydrocarbons from aliphatic hydrocarbons which comprises subjecting the aliphatic hydrocarbons at elevated temperatures to a catalyst comprising an oxide selected from the group consisting of vanadium oxide, molybdenum oxide and chromium oxide, in admixture with barium peroxide.

2. A process for the production of aromatic hydrocarbons from aliphatic hydrocarbons having from about 6 to about 20 carbon atoms which comprises subjecting said aliphatic hydrocarbons to a temperature sufficient to effect cracking, dehydrogenation and cyclization in the presence of a catalyst comprising barium peroxide and a compound selected from the group consisting of chromium oxide, molybdenum oxide and vanadium oxide.

3. A process for the production of aromatic hydrocarbons from aliphatic hydrocarbons having from about 6 to about 20 carbon atoms which comprises subjecting said aliphatic hydrocarbons to a temperature between about 450° and 750° C. in the presence of a catalyst comprising barium peroxide and a compound selected from the group consisting of chromium oxide, molybdenum oxide and vanadium oxide.

4. A process for the production of aromatic hydrocarbons from aliphatic hydrocarbons having from about 6 to about 20 carbon atoms which comprises subjecting said aliphatic hydrocarbons to a temperature between about 450° and 750° C. in the presence of a catalyst comprising barium peroxide and a compound selected from the group consisting of chromium oxide, molybdenum oxide and vanadium oxide for a period of time from about 1 to less than about 25 seconds.

5. A process for the production of aromatic hydrocarbons from aliphatic hydrocarbons which comprises subjecting said aliphatic hydrocarbons at elevated temperatures to a catalyst comprising a major proportion of an aluminum oxide support and minor proportions of barium peroxide and a compound selected from the group consisting of chromium oxide, molybdenum oxide and vanadium oxide.

6. A process for the production of aromatic hydrocarbons from aliphatic hydrocarbons having from about 6 to about 20 carbon atoms which comprises subjecting said aliphatic hydrocarbons to a temperature sufficient to effect cracking, dehydrogenation and cyclization in the presence of a catalyst comprising more than about 50 per cent of activated aluminum oxide, less than about 25 per cent of barium peroxide and less than about 25 per cent of a compound selected from the group consisting of chromium sesquioxide, molybdenum sesquioxide and vanadium sesquioxide.

7. A process for the production of aromatic hydrocarbons from aliphatic hydrocarbons having from about 6 to about 20 carbon atoms which comprises subjecting said aliphatic hydrocarbons to a temperature between about 450° C. and about 600° C. for a period of time between about 1 and 25 seconds in the presence of a catalyst comprising a major proportion of an activated aluminum oxide support admixed with minor proportions of barium peroxide and a compound selected from the group consisting of chromium sesquioxide, molybdenum sesquioxide and vanadium sesquioxide.

8. The process recited in claim 7 wherein said aliphatic hydrocarbons comprise heptane and the resulting aromatic hydrocarbons comprises toluene.

9. A process for the production of aromatic hydrocarbons from aliphatic hydrocarbons which comprises subjecting the aliphatic hydrocarbons to a temperature sufficient to effect aromatization in the presence of barium peroxide and chromium oxide.

10. A process for the production of aromatic hydrocarbons from aliphatic hydrocarbons which comprises subjecting the aliphatic hydrocarbons to a temperature sufficient to effect aromatization in the presence of barium peroxide and molybdenum oxide.

11. A process for the production of aromatic hydrocarbons from aliphatic hydrocarbons which comprises subjecting the aliphatic hydrocarbons to a temperature sufficient to effect aromatization in the presence of barium peroxide and vanadium oxide.

12. A process for the production of aromatic hydrocarbons from aliphatic hydrocarbons having from about 6 to about 20 carbon atoms which comprises subjecting said aliphatic hydrocarbons to a temperature between about 400° C. and about 700° C. for a period of time between about 1 and 25 seconds in the presence of a catalyst comprising a major proportion of an activated aluminum oxide support admixed with minor proportions of barium peroxide and chromium sesquioxide.

13. A process for the production of aromatic hydrocarbons from aliphatic hydrocarbons having from about 6 to about 20 carbon atoms which comprises subjecting the aliphatic hydrocarbons to a temperature between about 400° C. and about 700° C. for a period of time between about 1 and 25 seconds in the presence of a catalyst comprising a major proportion of an activated aluminum oxide support admixed with minor proportions of barium peroxide and molybdenum sesquioxide.

14. A process for the production of aromatic hydrocarbons from an aliphatic hydrocarbon having from about 6 to about 20 carbon atoms which comprises subjecting said aliphatic hydrocarbons to a temperature between about 400° C., and about 700° C. for a period of time between about 1 and 25 seconds in the presence of a catalyst comprising a major proportion of an activated aluminum oxide support admixed with minor proportions of barium peroxide and vanadium sesquioxide.

KENNETH C. EDSON.
FRANK E. FISHER.